(12) United States Patent
Yoo et al.

(10) Patent No.: US 10,820,331 B2
(45) Date of Patent: Oct. 27, 2020

(54) METHOD FOR CONTROLLING WIRELESS COMMUNICATION IN BEAMFORMING-BASED CELLULAR SYSTEM

(71) Applicant: Samsung Electronics Co., Ltd., Gyeonggi-do (KR)

(72) Inventors: Hyunil Yoo, Gyeonggi-do (KR); Hyungju Nam, Gyeonggi-do (KR); Jeehwan Noh, Gyeonggi-do (KR); Yongok Kim, Seoul (KR); Taeyoung Kim, Seoul (KR); Jiyun Seol, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/888,689

(22) Filed: Feb. 5, 2018

(65) Prior Publication Data

US 2018/0227929 A1 Aug. 9, 2018

(30) Foreign Application Priority Data

Feb. 3, 2017 (KR) .................. 10-2017-0015812
Jun. 26, 2017 (KR) .................. 10-2017-0080551
Feb. 2, 2018 (KR) .................. 10-2018-0013325

(51) Int. Cl.
*H04W 72/08* (2009.01)
*H04L 5/00* (2006.01)
(Continued)

(52) U.S. Cl.
CPC ........ *H04W 72/085* (2013.01); *H04B 7/0413* (2013.01); *H04B 7/0617* (2013.01);
(Continued)

(58) Field of Classification Search
CPC ... H04B 7/0413; H04B 7/0617; H04L 5/0048; H04L 5/005; H04L 5/0051;
(Continued)

(56) References Cited

U.S. PATENT DOCUMENTS 7,027,464 B1* 4/2006 Nakahara .............. H04L 5/0048
370/203
2013/0279437 A1* 10/2013 Ng ........................ H04W 48/16
370/329
(Continued)

FOREIGN PATENT DOCUMENTS

KR 10-2015-0116183 10/2015

*Primary Examiner* — Kashif Siddiqui
(74) *Attorney, Agent, or Firm* — The Farrell Law Firm, P.C.

(57) ABSTRACT

The present disclosure relates to a communication scheme and system for converging a $5^{th}$ generation (5G) communication system for supporting a data rate higher than that of a $4^{th}$ generation (4G) system with an internet of things (IoT) technology. The present disclosure is applicable to intelligent services (e.g., smart homes, smart buildings, smart cities, smart cars, connected cars, health care, digital education, retails, and security and safety-related services) based on the 5G communication technology and the IoT-related technology. The present disclosure relates to a radio network technology for use in a beamforming-based cellular system. A method for compensating phase noise by a user equipment (UE) is provided. The method comprises receiving, from a base station, association information between at least one phase tracking reference signal (PTRS) port and at least one demodulation reference signal (DMRS) port, identifying phase noise between the UE and the base station based on the association information, and compensating for the phase noise based on the result of the identification.

4 Claims, 26 Drawing Sheets

(51) Int. Cl.
   *H04B 7/06*     (2006.01)
   *H04W 72/04*    (2009.01)
   *H04B 7/0413*   (2017.01)
   *H04W 88/08*    (2009.01)
   *H04W 88/02*    (2009.01)
   *H04W 74/08*    (2009.01)

(52) U.S. Cl.
   CPC ............ *H04L 5/005* (2013.01); *H04L 5/0048* (2013.01); *H04L 5/0051* (2013.01); *H04W 72/046* (2013.01); *H04W 74/0833* (2013.01); *H04W 88/02* (2013.01); *H04W 88/08* (2013.01)

(58) Field of Classification Search
   CPC ............ H04W 72/046; H04W 72/085; H04W 74/0833; H04W 88/02; H04W 88/08
   See application file for complete search history.

(56) References Cited

U.S. PATENT DOCUMENTS

| | | | |
|---|---|---|---|
| 2014/0126496 A1* | 5/2014 | Sayana | H04B 7/024 370/329 |
| 2015/0249517 A1* | 9/2015 | Seo | H04W 16/10 370/329 |
| 2015/0365154 A1* | 12/2015 | Davydov | H04B 7/024 370/329 |
| 2017/0033854 A1 | 2/2017 | Yoo | |
| 2017/0093538 A1* | 3/2017 | Yoon | H04B 7/0626 |
| 2018/0091350 A1* | 3/2018 | Akkarakaran | G01S 13/346 |
| 2018/0145854 A1* | 5/2018 | Akkarakaran | H04L 5/0048 |
| 2018/0198667 A1* | 7/2018 | He | H04L 27/2662 |
| 2018/0287681 A1* | 10/2018 | Chen | H04W 72/04 |
| 2018/0331804 A1* | 11/2018 | Hessler | H04L 5/0007 |
| 2018/0351719 A1* | 12/2018 | Lee | H04L 5/0048 |

* cited by examiner

FIG. 2

```
PRACH-ConfigSIB ::=      SEQUENCE {
    rootSequenceIndex        INTEGER (0..837),
    prach-ConfigInfo         PRACH-ConfigInfo
}

PRACH-ConfigInfo ::=     SEQUENCE {
    prach-ConfigIndex            INTEGER (0..63),
    highSpeedFlag                BOOLEAN,
    zeroCorrelationZoneConfig    INTEGER (0..15),
    prach-FreqOffset             INTEGER (0..94)
}
```

FIG. 3

Table 5.7.1-2: Frame structure type 1 random access configuration for preamble formats 0-3.

| PRACH Configuration Index | Preamble Format | System frame number | Subframe number | PRACH configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7, | 41 | 2 | Any | 1, 4, 7, |
| 10 | 0 | Any | 2, 5, 8, | 42 | 2 | Any | 2, 5, 8, |
| 11 | 0 | Any | 3, 6, 9, | 43 | 2 | Any | 3, 6, 9, |
| 12 | 0 | Any | 0, 2, 4, 6, 8 | 44 | 2 | Any | 0, 2, 4, 6, 8 |
| 13 | 0 | Any | 1, 3, 5, 7, 9, | 45 | 2 | Any | 1, 3, 5, 7, 9, |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

FIG. 4

Table 5.7.1-3: Frame structure type 2 random access configuration for preamble formats 0-4.

| PRACH configuration Index | Preamble Format | Density Per 10ms $D_{R.A}$ | Version $r_{R.A}$ | PRACH configuration Index | Preamble Format | System Per 10ms $D_{R.A}$ | Version $r_{R.A}$ |
|---|---|---|---|---|---|---|---|
| 0 | 0 | 0.5 | 0 | 32 | 2 | 0.5 | 2 |
| 1 | 0 | 0.5 | 1 | 33 | 2 | 1 | 0 |
| 2 | 0 | 0.5 | 2 | 34 | 2 | 1 | 1 |
| 3 | 0 | 1 | 0 | 35 | 2 | 2 | 0 |
| 4 | 0 | 1 | 1 | 36 | 2 | 3 | 0 |
| 5 | 0 | 1 | 2 | 37 | 2 | 4 | 0 |
| 6 | 0 | 2 | 0 | 38 | 2 | 5 | 0 |
| 7 | 0 | 2 | 1 | 39 | 2 | 6 | 0 |
| 8 | 0 | 2 | 2 | 40 | 3 | 0.5 | 0 |
| 9 | 0 | 3 | 0 | 41 | 3 | 0.5 | 1 |
| 10 | 0 | 3 | 1 | 42 | 3 | 0.5 | 2 |
| 11 | 0 | 3 | 2 | 43 | 3 | 1 | 0 |
| 12 | 0 | 4 | 0 | 44 | 3 | 1 | 1 |
| 13 | 0 | 4 | 1 | 45 | 3 | 2 | 0 |
| 14 | 0 | 4 | 2 | 46 | 3 | 3 | 0 |
| 15 | 0 | 5 | 0 | 47 | 3 | 4 | 0 |
| 16 | 1 | 5 | 1 | 48 | 4 | 0.5 | 0 |
| 17 | 1 | 5 | 2 | 49 | 4 | 0.5 | 1 |
| 18 | 1 | 6 | 0 | 50 | 4 | 0.5 | 2 |
| 19 | 1 | 6 | 1 | 51 | 4 | 1 | 0 |
| 20 | 1 | 0.5 | 0 | 52 | 4 | 1 | 1 |
| 21 | 1 | 0.5 | 1 | 53 | 4 | 2 | 0 |
| 22 | 1 | 0.5 | 2 | 54 | 4 | 3 | 0 |
| 23 | 1 | 1 | 0 | 55 | 4 | 4 | 0 |
| 24 | 1 | 1 | 1 | 56 | 4 | 5 | 0 |
| 25 | 1 | 2 | 0 | 57 | 4 | 6 | 0 |
| 26 | 1 | 3 | 0 | 58 | N/A | N/A | N/A |
| 27 | 1 | 4 | 0 | 59 | N/A | N/A | N/A |
| 28 | 1 | 5 | 0 | 60 | N/A | N/A | N/A |
| 29 | 1 | 6 | 0 | 61 | N/A | N/A | N/A |
| 30 | 2 | 0.5 | 0 | 62 | N/A | N/A | N/A |
| 31 | 2 | 0.5 | 1 | 63 | N/A | N/A | N/A |

FIG. 5

```
PRACH-ConfigCommonRegion ::=   SEQUENCE {
        rootSequenceIndex              INTEGER (0..837),
        prach-ConfigInfoComm           PRACH-ConfigInfoComm }
PRACH-ConfigComm ::= SEQUENCE {
        prach-ConfigInfoComm           PRACH-ConfigInfoComm      OPTIONAL -- Need ON }
PRACH-ConfigInfoComm ::= SEQUENCE {
        prach-ConfigIndex              NTEGER (0..N) (N = 64 * num.of Cells),
        highSpeedFlag                  BOOLEAN,
        zeroCorrelationZoneConfig      INTEGER (0..15),
        prach-FreqOffset               INTEGER (0..94]

Table 5.7.1-1: Random access preamble parameters.

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

FIG. 7

```
PRACH-ConfigBeam ::= SEQUENCE {
        rootSequenceIndex              INTEGER (0..837),
        prach-ConfigInfoComm    PRACH-ConfigInfoComm,
        PRACH-ConfigBeam            PRACH-ConfigBeam }
PRACH-ConfigBeam :: = SEQUENCE {
        prach-ConfigInfoBeam    PRACH-ConfigInfoBeam       OPTIONAL -- Need ON
}
PRACH-ConfigInfoBeam ::= SEQUENCE {
        prach-ConfigIndex              NTEGER (0..63),
        highSpeedFlag                    BOOLEAN,
        zeroCorrelationZoneConfig    INTEGER (0..15),
        prach-FreqOffset            INTEGER (0..94)

}
PRACH-ConfigBeam::= SEQUENCE{
prach_beam_procedure    INTEGER (0..3),
prach_preamble_format    INTEGER (0..3),
Max_prach_trans            INTEGER (0···15)
Prach-SCS                        INTEGER (0···.7)
}
```

FIG. 9

```
SoundingRS-UL-ConfigCommon ::= CHOICE {
    release NULL,
    setup SEQUENCE {
    srs-BandwidthConfig ENUMERATED {bw0, bw1, bw2, bw3, bw4, bw5, bw6, bw7},
    srs-SubframeConfig ENUMERATED {
        sc0, sc1, sc2, sc3, sc4, sc5, sc6, sc7, sc8, sc9, sc10, sc11, sc12, sc13, sc14, sc15},
    ackNackSRS-SimultaneousTransmission BOOLEAN,
    srs-MaxUpPts ENUMERATED {true} OPTIONAL -- Cond TDD
    }
}
SoundingRS-UL-ConfigDedicated ::= CHOICE{
    release NULL,
    setup SEQUENCE {
        srs-Bandwidth ENUMERATED {bw0, bw1, bw2, bw3},
        srs-HoppingBandwidth ENUMERATED {hbw0, hbw1, hbw2, hbw3},
        freqDomainPosition INTEGER (0..23),
        duration BOOLEAN,
        srs-ConfigIndex INTEGER (0..1023),
        transmissionComb INTEGER (0..1),
        cyclicShift ENUMERATED {cs0, cs1, cs2, cs3, cs4, cs5, cs6, cs7}
    }
}
```

FIG. 11

```
SoundingRS-UL-RRM-ConfigCommon ::= CHOICE {
    release NULL,
    setup SEQUENCE {
    srs-BandwidthConfig ENUMERATED {bw0, bw1, bw2, bw3, bw4, bw5, bw6, bw7},
    srs-SubframeConfig ENUMERATED {
            sc0, sc1, sc2, sc3, sc4, sc5, sc6, sc7, sc8, sc9, sc10, sc11, sc12, sc13, sc14, sc15},
    ackNackSRS-SimultaneousTransmission BOOLEAN,
    srs-MaxUpPts ENUMERATED {true} OPTIONAL -- Cond TDD
    Subcarrier spacing
    }}
```

FIG. 12

```
SoundingRS-UL-RRM_ConfigDedicated_::= CHOICE{
      release NULL,
      setup SEQUENCE {
            srs-Bandwidth ENUMERATED {bw0, bw1, bw2, bw3},
            srs-HoppingBandwidth ENUMERATED {hbw0, hbw1, hbw2, hbw3},
            freqDomainPosition INTEGER (0..23),
            duration BOOLEAN,
            srs-ConfigIndex INTEGER (0..1023),
            transmissionComb INTEGER (0..3),
            cyclicShift ENUMERATED {cs0, cs1, cs2, cs3, cs4, cs5, cs6, cs7}
subcarrier spacing
            # of symbols
      }
}
```

FIG. 14

```
SoundingRS-UL-ConfigCommon_Beam ::= CHOICE {
        release NULL,
        setup SEQUENCE {
                srs-BandwidthConfig ENUMERATED {bw0, bw1, bw2, bw3, bw4, bw5, bw6, bw7},
                srs-SubframeConfig ENUMERATED {
                        sc0, sc1, sc2, sc3, sc4, sc5, sc6, sc7, sc8, sc9, sc10, sc11, sc12, sc13, sc14, sc15},
                ackNackSRS-SimultaneousTransmission BOOLEAN,
                srs-MaxUpPts ENUMERATED {true} OPTIONAL -- Cond TDD
srs-MaxTrans ENUMERATED,
                }
}
```

FIG. 15

```
SoundingRS-UL-Beam_ConfigDedicated_::= CHOICE{
    release NULL,
    setup SEQUENCE {
        srs-Bandwidth ENUMERATED {bw0, bw1, bw2, bw3},
        srs-HoppingBandwidth ENUMERATED {hbw0, hbw1, hbw2, hbw3},
        freqDomainPosition INTEGER (0..23),
        duration BOOLEAN,
        srs-ConfigIndex INTEGER (0..1023),
        transmissionComb INTEGER (0..1),
        cyclicShift ENUMERATED {cs0, cs1, cs2, cs3, cs4, cs5, cs6, cs7}
srs-SCS ENUMERATED,
srs-MaxTrans ENUMERATED,
srs-type BOOLEAN
        }
}
```

METHOD FOR CONTROLLING WIRELESS COMMUNICATION IN BEAMFORMING-BASED CELLULAR SYSTEM

CROSS-REFERENCE TO RELATED APPLICATION(S)

This application is based on and claims priority under 35 U.S.C. § 119 to Korean Patent Application No. 10-2017-0015812, filed on Feb. 3, 2017 in the Korean Intellectual Property Office, to Korean Patent Application No. 10-2017-0080551, filed on Jun. 26, 2017 in the Korean Intellectual Property Office, and to Korean Patent Application No. 10-2018-0013325, filed on Feb. 2, 2018 in the Korean Intellectual Property Office the disclosure of each of which is incorporated by reference herein in its entirety.

BACKGROUND

1. Field

The disclosure relates to a wireless network technology for use in a beamforming-based cellular system.

2. Description of Related Art

In order to meet the increasing demand for wireless data traffic since the commercialization of 4th generation (4G) communication systems, the development focus is on 5th generation (5G) or pre-5G communication systems. For this reason, the 5G or pre-5G communication systems are called a beyond 4G network communication system or a post long-term evolution (LTE) system. Implementation of the 5G communication system in millimeter wave (mmW) frequency bands (e.g., 60 GHz bands) is considered to accomplish higher data rates. In order to increase the propagation distance by mitigating propagation loss in the 5G communication system, discussions are underway about techniques such as beamforming, massive multiple-input multiple output (mMIMO), full dimensional MIMO (FD-MIMO), array antenna, analog beamforming, and large-scale antenna. Also, in order to enhance network performance of the 5G communication system, developments of techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation are underway. Furthermore, the ongoing research includes the use of hybrid frequency shift keying (FSK) quadrature amplitude modulation (QAM) (FQAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network, in which information is generated and consumed by humans, to the Internet of things (IoT), in which distributed things or components exchange and process information. The combination of the cloud server-based big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet technology that is capable of collecting and analyzing data generated from connected things to create new values for human life. The IoT can be applied to various fields such as a smart home, a smart building, a smart city, a smart car or connected car, a smart grid, health care, a smart appliance, and a smart medical service through legacy information technology (IT) and convergence of various industries.

Thus, there have been many attempts which apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

SUMMARY

The present disclosure provides a method for transmitting reference signals (RS) to support uplink-based mobility, a method for phase tracking reference signal (PTRS) management, and an apparatus for compensating for phase noise.

In accordance with an aspect of the present disclosure, a method for compensating phase noise by a user equipment (UE) is provided. The method includes receiving, from a base station, association information between at least one PTRS port and at least one demodulation reference signal (DMRS) port, identifying phase noise between the UE and the base station based on the association information, and compensating for the phase noise based on the result of the identification.

According to an embodiment, the association information indicates that a PTRS port is quasi-co-located with a DMRS port.

According to an embodiment, the association information is received through a higher layer signaling.

According to an embodiment, a PTRS port is used to estimate the phase noise occurring in an oscillator corresponding to the PTRS port in a multi-transmission and reception point (TRP) environment.

According to an embodiment, the association information includes at least one of a delay spread, a doppler spread, a doppler shift, an average delay, and an average gain.

According to another aspect of the present disclosure, a method for compensating phase noise by a base station is provided. The method includes generating association information between at least one PTRS port and at least one DMRS port, and transmitting, to a user equipment (UE), the association information to compensate phase noise between the UE and the base station based on the association information.

According to an embodiment, the association information indicates that a PTRS port is quasi-co-located with a DMRS port.

According to an embodiment, the association information is transmitted through a higher layer signaling.

According to an embodiment, a PTRS port is used to estimate the phase noise occurring in an oscillator corresponding to the PTRS port in a multi-transmission and reception point (TRP) environment.

According to an embodiment, the association information includes at least one of a delay spread, a doppler spread, a doppler shift, an average delay, and an average gain.

According to another aspect of the present disclosure, a user equipment (UE) for compensating phase noise in a wireless communication system is provided. The UE includes a transceiver and a controller coupled with the transceiver. The controller is configured to control to receive, from a base station, association information between at least one PTRS port and at least one DMRS port, identify phase noise between the UE and the base station based on the association information, and compensate for the phase noise based on the result of the identification.

According to another aspect of the present disclosure, a base station for compensating phase noise in a wireless communication system is provided. The base station includes a transceiver, and a controller coupled with the transceiver. The controller is configured to control to generate association information between at least one PTRS port and at least one DMRS port, and transmit, to a user equipment (UE), the association information to compensate phase noise between the UE and the base station based on the association information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a diagram illustrating a physical random access channel (PRACH) configuration transmitted by means of a system information block (SIB) according to the first embodiment of the present invention.

FIG. 3 is a table illustrating prach_ConfigIndex indicating a subframe index for PRACH transmission in frequency division duplex (FDD) according to the first embodiment of the present invention;

FIG. 4 is a table illustrating prach_ConfigIndex indicating a subframe index for PRACH transmission in time division duplex (TDD) according to the first embodiment of the present invention;

FIG. 5 is a diagram illustrating a UE-dedicated radio resource control (RRC) message for receiving a random access channel (RACH) in a common region according to the first embodiment of the present invention;

FIG. 6 is a table illustrating a RACH preamble formation in LTE according to the first embodiment of the present invention;

FIG. 7 is a diagram illustrating a RACH configuration for performing up link (UL) beam measurement according to the first embodiment of the present invention;

FIG. 9 is a diagram illustrating a sounding reference signal (SRS) configuration for periodic SRS transmission according to the first embodiment of the present invention;

FIG. 11 is a diagram illustrating a cell-specific SRS configuration for UL RRM measurement according to the first embodiment of the present invention;

FIG. 12 is a diagram illustrating a UE-specific SRS configuration for supporting UL-based mobility according to the first embodiment of the present invention;

FIG. 14 is a diagram illustrating a cell-specific SRS configuration for UL beam measurement according to the first embodiment of the present invention;

FIG. 15 is a diagram illustrating a UE-specific SRS configuration for UL beam measurement according to the first embodiment of the present invention;

DETAILED DESCRIPTION

Figure 1:
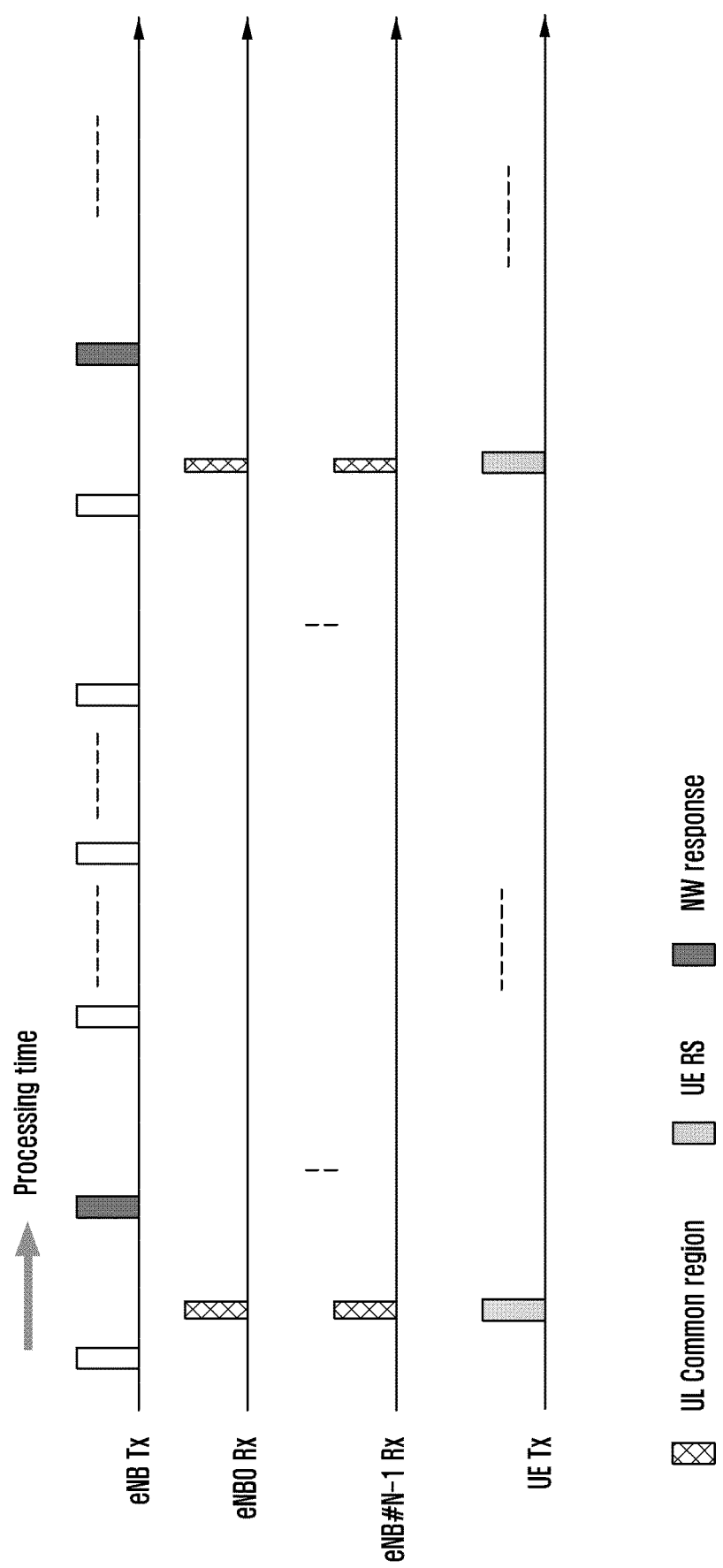
FIG. 1 is a conceptual diagram illustrating an uplink-based radio resource management (RRM) measurement, according to the first embodiment of the present invention.

Exemplary embodiments of the present invention are described in detail with reference to the accompanying drawings. Detailed descriptions of well-known functions and structures incorporated herein may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions are executed via the processor of the computer or other programmable data processing apparatus to create a means for implementing the functions (e.g., acts or steps) specified in the flowcharts and/or block diagrams.

These computer program instructions may also be stored in a non-transitory computer-readable memory that can direct a computer or other programmable data processing apparatus to function in a particular manner, such that the instructions stored in the non-transitory computer-readable memory implement the functions, acts, or steps specified in flowcharts and/or block diagrams. The computer program instructions may also be loaded onto a computer or other programmable data processing apparatus as commands to cause a series of operational steps to be performed on the computer or other programmable apparatus to produce a computer implemented process such that the instructions that are executed on the computer or other programmable apparatus provide steps for implementing the functions, acts, or steps specified in flowcharts and/or block diagrams.

Furthermore, respective block diagrams may illustrate parts of modules, segments, or codes including at least one or more executable instructions for performing specific logic function(s). Moreover, it should be noted that the functions of blocks may be performed in different orders. For example, two successive blocks may be performed substantially at the same time, or may be performed in reverse order, according to their functions.

According to various embodiments of the present disclosure, the term "module" means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in components and modules may be combined into fewer components and modules or further separated into additional components and modules. In addition, components and modules may be implemented such that they execute one or more central processing units (CPUs) in a device or a secure multimedia card.

First Embodiment

In LTE, radio resource management (RRM) measurement is performed based on a downlink (DL). The DL-based RRM measurement is performed in such a way that an evolved Node B (eNB) transmits a reference signal (RS) for RRM measurement to a user equipment (UE) and the UE reports an RRM measurement result to the eNB. Unlike the downlink-based (DL-based) RRM measurement procedure, an uplink-based RRM measurement procedure is characterized in that the UE transmits an RS and the serving and neighboring eNBs perform RRM measurement on the RS.

The UL-based RRM measurement has advantages in comparison with the DL-based RRM measurement.

First, the UL-based RRM measurement is expected to reduce power consumption of the UE. The DL-based RRM measurement is performed in such a way that eNBs transmit signals and the UE measures signal quality per eNB. In this case, the UE has to perform an operation on N neighboring signals. Whereas, in the UL-based RRM measurement, the UE just needs to generate and transmit a signal; thus, the UL-based RRM measurement is expected to reduce power consumption.

Second, the UL-based RRM measurement is expected to improve resource utilization efficiency of the eNB. With regard to the DL-based RRM measurement, it is difficult for the eNB to locate the UE accurately. Accordingly, the eNB has to page the UE within a broad area; however, in the UL-based RRM measurement procedure the eNB locates the UE based on the RS transmitted by the UE, therefore there is no need to transmit the paging signal within a broad area.

In order to perform a UL-based RRM measurement, it is necessary to transmit an RS for use in a UL-based RRM measurement. In LTE, the following signals can be used as an RS for UL-based RRM measurement:

1. RACH (Random Access Channel)
2. UL DMRS (UL Demodulation RS)
3. UL SRS (UL Sounding RS)

FIG. 1 is a conceptual diagram illustrating an uplink-based RRM measurement, according to the first embodiment of the present invention. Assuming that there are N eNBs, all of the N eNBs need to receive an RS transmitted by a UE simultaneously. The eNB that has received the RS from the UE sends the UE an RRM measurement result after a predetermined processing time. Here, there is a need to define a common region (UL common region) in order for all of the eNBs to receive the RS, as a downlink.

FIG. 2 is a diagram illustrating a RACH configuration conveyed by a SIB, according to the first embodiment of the present invention.

In FIG. 2, the PRACH configuration is a cell-specific signal. Therefore, all UEs located within the cell receive the signal. Among the signals depicted in FIG. 2, prach_ConfigIndex is a parameter indicating a subframe for conveying PRACH within the cell and in an FDD mode that carries information.

FIG. 3 is a table illustrating prach_ConfigIndex indicating a subframe index for PRACH transmission in FDD, according to the first embodiment of the present invention.

FIG. 4 is a table illustrating prach_ConfigIndex indicating a subframe index for PRACH transmission in TDD, according to the first embodiment of the present invention.

As summarized in FIGS. 3 and 4, the subframe index indicates the subframe in which the eNB/UE may receive/transmit RACH by means of an SIB within the cell. Typically, the cells set the prach_ConfigIndex to different subframe indices to minimize the collision probability.

The first approach for an eNB to use an RS transmitted by the UE for UL RRM measurement is to set the prach_ConfigIndex of the SIB to the same value for the neighboring cells by referencing the tables as shown in FIGS. 3 and 4.

That is, by sharing the subframe indices for use in transmitting/receiving RACH among the cells, all eNBs may receive a PRACH transmitted by the UE. It may also be necessary to share all parameters of the PRACH configuration among the cells. However, if the PRACH for initial access and the PRACH for UL RRM are not distinguished from each other, and are thus transmitted in a contention-based way, the eNB cannot determine the UE that transmitted the RACH for UL RRM based on only the RACH transmission. This approach may also increase the collision probability of RACH for initial access.

The second approach for an eNB to use an RS transmitted by the UE for UL RRM measurement is to transmit a PRACH configuration to the UE through RRC signaling while the neighboring eNBs share the information conveyed by the RRC message. In this case, it is necessary to define a new RRC message for sending the PRACH configuration to the UE through RRC signaling. The common region for common use among the cells is defined as RACH config-CommonRegion for receiving RACH.

The third approach for an eNB to use an RS transmitted by the UE for UL RRM measurement is to transmit a PRACH configuration to the UE by means of downlink control information (DCI). It may also be necessary for all eNBs to share the DCI. However, the PRACH configuration may require too many bits to transmit with DCI, and this situation may be indicated by overhead of a physical downlink control channel (PDCCH).

The UL RRM measurement may be performed by the UE in a CONNECTED mode. Although the RACH configuration is defined without distinction between a CONNECTED mode and an IDLE mode, the RACH transmission in the CONNECTED mode may be defined to reduce power consumption of the UE and improve resource utilization efficiency of the eNB in a way that is different than the RACH transmission in the IDLE mode.

FIG. 5 is a diagram illustrating a UE-dedicated RRC message for receiving RACH in a common region, according to the first embodiment of the present invention.

FIG. 6 is a diagram illustrating an RACH preamble formation in LTE, according to the first embodiment of the present invention.

The RACH preamble is composed of a period $T_{cp}$ and another period $T_{seq}$, and defined with five different formats concerning cell coverage. Here, the period $T_{cp}$ is designed to cover twice the cell coverage in consideration of a round trip delay between the eNB and UE because the UE in the IDLE mode has no UL synchronization.

Since the RRM measurement is performed by a UE in the CONNECTED mode, as described above, it is not necessary for the cyclic prefix (CP) length to be twice of the cell coverage as shown in FIG. 6. That is, the $T_{cp}$ for RACH in the CONNECTED mode has the length half the $T_{cp}$ for RACH in the IDLE mode. Accordingly, the UE which has received the RACH configuration as depicted in FIG. 5 may transmit a RACH with the CP length corresponding to half the $T_{cp}$ for the IDLE mode RACH.

The CONNECTED mode RACH is also characterized by a number of preamble IDs that are more than that of the IDLE mode RACH. In LTE, 64 preamble IDs are supported for IDLE mode RACH per cell. The preamble IDs are allocated so as to avoid collision between cells. However, since the RACH transmitted in the common region may be received by all cells and transmission/reception points (TRP), as described with reference to FIG. 1, it is necessary to allocate a preamble ID that can be shared among the cells. That is, 64 preamble sets have to be increased as many as D times in order for the UEs located within D cells to transmit RACH. That is, the prach-ConfigIndex in PRACH-Config-InfoCommd has to provide 64*number of cells.

The PRACH may be used for UL beam measurement and may transmit RACH for UL beam measurement in a beamforming-based system. Since the UL beam measurement procedure may be performed in a UE-specific manner, it may be possible to perform the UL beam measurement using DCI. For the UL beam measurement, a U-1 procedure may train both the transmission and reception beams of the eNB and UE, a U-2 procedure for training the reception beam of the eNB, and a U-3 procedure for training the transmission beam of the UE. Thus, there is a need for an extra 2-bit indicator for indicating one of U-1 to U-3 procedures.

FIG. 7 is a diagram illustrating a RACH configuration for performing UL beam measurement, according to the first embodiment of the present invention.

In FIG. 7, prach configBeam is the information about the aforementioned U-1, U-2, and U-3 and it may be added to the RRC message as the common region as shown in FIG. 6. That is, when the eNBs/TRPs receive RACH in the common region, they may share the RRC message to perform UL beam measurement. The eNB may not perform the UL beam measurement for the case where prach_beam_procedure is set to 0 and may perform the U-1 procedure for the case where prach_beam_procedure is set to 1, the U-2 procedure for the case where prach_beam_procedure is set to 2, and the U-3 procedure for the case where prach_beam_procedure is set to 3. The prach_beam_procedure is a parameter indicating a prach_format for multi-beam operation.

Figure 8:
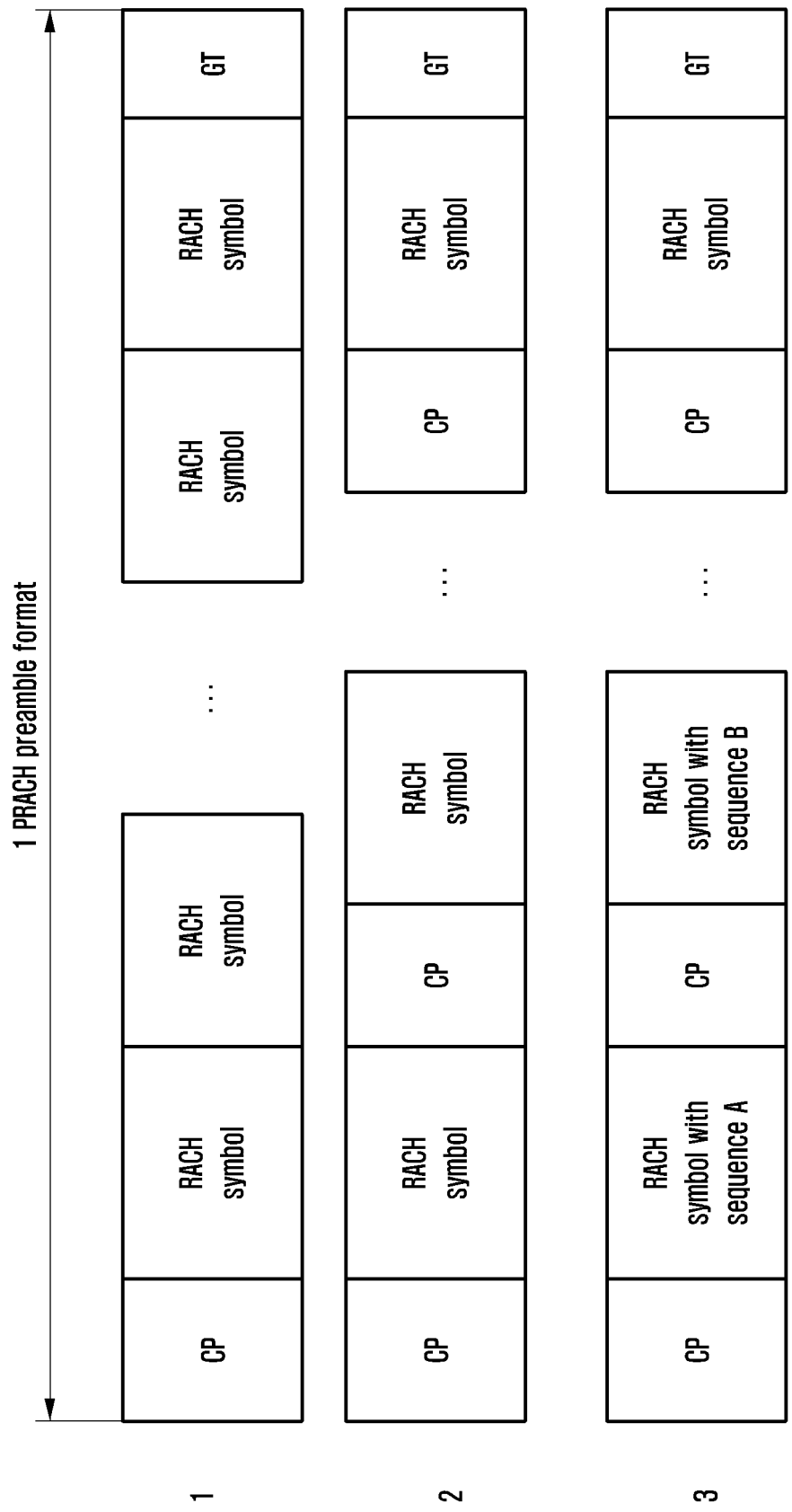
FIG. 8 is a diagram illustrating a PRACH format according to the first embodiment of the present invention.

FIG. 8 is a diagram illustrating a PRACH format, according to the first embodiment of the present invention.

As shown in FIG. 8, it may be possible to perform transmission with a PRACH format selected according to the value of prach_preamble_format. The max_prach_format is a parameter indicating how many times the PRACH symbol is repeated in a preamble format.

FIG. 9 is a diagram illustrating an SRS configuration for periodic SRS transmission, according to the first embodiment of the present invention.

In FIG. 9, SoundingRS-UL-ConfigCommon indicates a cell-specific configuration transmitted to the UE via an SIB. SoundingRS-ConfigDedicated indicates a UE-specific configuration transmitted through RRC signaling. The cell-specific configuration is conveyed by all subframes capable of conveying SRS within a cell and may be allocated without overlapping neighboring cells through coordination. The UE-specific configuration indicates a UE-specific SRS transmission subframe position. The UE may transmit the periodic SRS at the subframe indicated by the subframe index conveyed in the two types of configurations. The parameter "subcarrier spacing" in the cell-specific SRS configuration indicates subcarrier spacing for SRS resource configuration.

Figure 10:
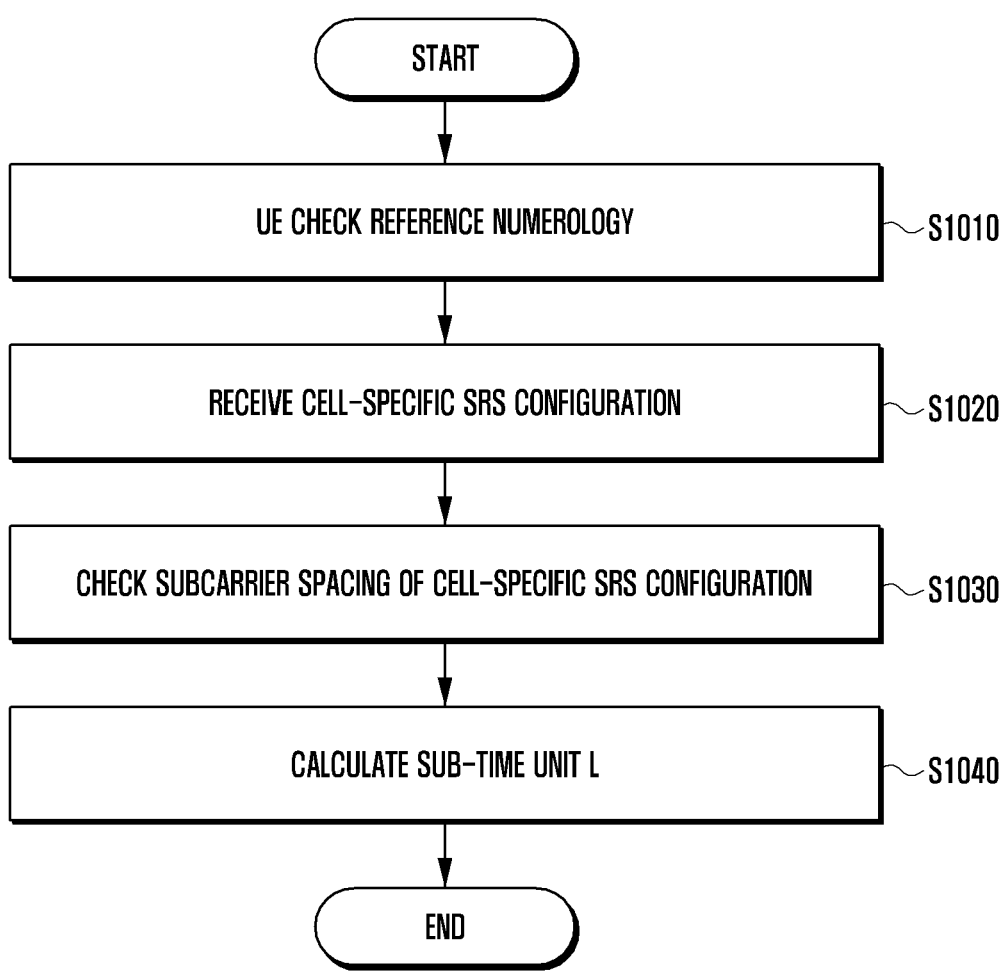
FIG. 10 is a flowchart illustrating a method for configuring a sub-time unit in a fourth approach to use RS for RRM measurement according to the first embodiment of the present invention.

FIG. 10 is a flowchart illustrating a method for configuring a sub-time unit in a fourth approach to use RS for RRM measurement, according to the first embodiment of the present invention. Referring to FIG. 10, the UE checks reference numerology (S1010) and receives cell-specific SRS configuration (S1020). The UE checks subcarrier spacing of cell-specific SRS configuration (S1030) and calculates sub-time unit L (L=subcarrier spacing/reference numerology) (S1040).

The fourth approach for an eNB to use an RS transmitted by the UE for UL RRM measurement is to share the cell-specific SRS configurations among all eNBs as shown in FIG. 10. This method makes it possible for all of the eNBs to receive SRS transmitted by the UE but to increase the SRS collision probability, resulting in SRS-based uplink RRM measurement performance degradation. Here, it may be possible to use the transmissionComb contained in the dedicated SRS configuration as a sub-time unit for reducing the beam measurement time.

The fifth approach for an eNB to use an RS transmitted by the UE for UL RRM measurement is to define a new cell-specific SRS configuration for UL RRM measurement and share the configuration among all eNBs. It may be possible to transmit an SRS for UL beam measurement in the subframe determined according to the cell-specific SRS configuration. It may further be possible to apply the sub-time unit for reducing the beam measurement time, which may be referred to as transmission comb or subcarrier spacing. That is, it may be possible to determine the SRS resources based on a reference numerology, data or control channel numerology and the numerology based on the subcarrier spacing conveyed in the cell-specific SRS configuration. The UE may determine a number of sub-time units L (e.g., subcarrier spacing/reference numerology) based on reference numerology and the subcarrier spacing value conveyed in the SRS configuration.

FIG. 10 is a diagram illustrating a first method for configuring the sub-time unit derived from the fourth approach for the eNB to use the RS transmitted by the UE. The eNB may calculate the sub-time and perform beam sweeping by sub-time unit. It may be possible to configure the sub-time unit using a transmission comb value of the cell-specific SRS configuration. In this case, it may be necessary to configure a UE-specific SRS configuration that does not allow UE multiplexing for accurate beam measurement.

FIG. 11 is a diagram illustrating a cell-specific SRS configuration for UL RRM measurement, according to the first embodiment of the present invention.

The sixth approach for an eNB to use an RS transmitted by the UE for UL RRM measurement is to define a new cell-specific SRS configuration for UL RRM measurement, as shown in FIG. 11, to share this configuration among all eNBs and to define a new UE-specific SRS configuration to share this configuration among all eNBs. It may be possible to transmit an SRS for UL beam measurement in the subframe indicated by the cell-specific SRS configuration. It may also be possible to apply the sub-time unit for reducing the beam measurement time, and this may be referred to as transmission comb or subcarrier spacing. That is, it may be possible to determine the SRS resources based on a reference numerology, data or control channel numerology and the numerology based on the subcarrier spacing conveyed in the cell-specific SRS configuration. The UE may determine a number of sub-time units L (e.g., subcarrier spacing/reference numerology) based on reference numerology and the subcarrier spacing value conveyed in the SRS configuration. It may also be possible to configure the sub-time unit using the transmission comb value contained in the cell-specific SRS configuration. In this case, it may be necessary to configure a UE-specific SRS configuration that does not allow UE multiplexing for accurate beam measurement.

FIG. 12 is a diagram illustrating a UE-specific SRS configuration for supporting UL-based mobility, according to the first embodiment of the present invention.

FIG. 12 shows a UE-specific configuration for periodic SRS transmission and aperiodic SRS transmission. It should be noted that sharing the configuration for RACH and SRS transmission as described above is identical with configuring the common region as described with reference to FIG. 1. In this way, the neighboring eNBs may receive the SRS/RACH transmitted by the UE and then transmit a response in reply.

Figure 13:
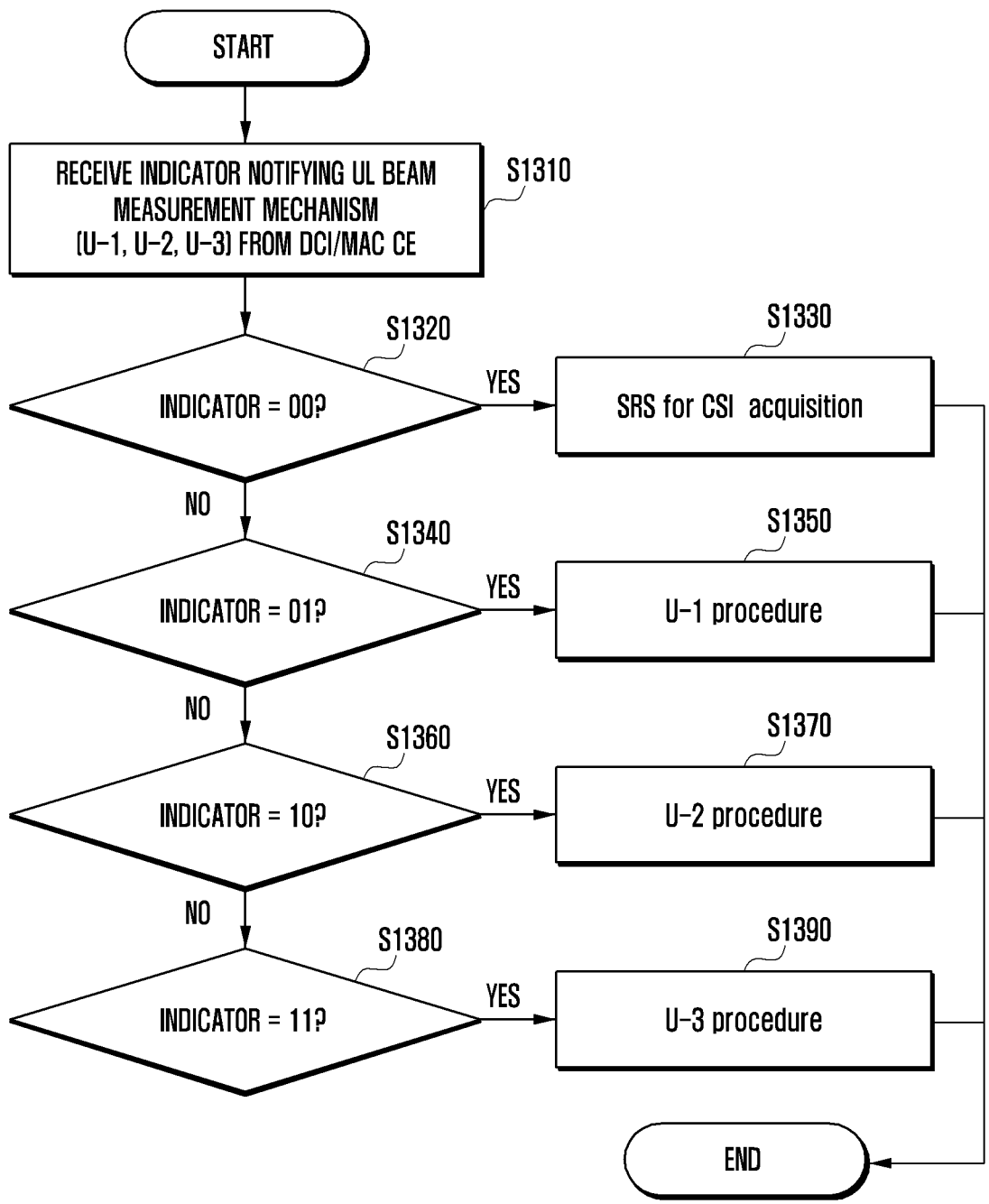
FIG. 13 is a flowchart illustrating a method for notifying a UL beam measurement mechanism according to the first embodiment of the present invention.

FIG. 13 is a flowchart illustrating a method for notifying a UL beam measurement mechanism, according to the first embodiment of the present invention.

Like PRACH, SRS may be used for UL beam measurement. That is, in a beamforming-based system, it may be possible to transmit SRS for uplink beam measurement. Since the UL beam measurement procedure can be performed in a UE-specific manner, it may be possible to perform the UL beam measurement using the signaling scheme of FIG. 13 or DCI.

In step S1310, an indicator notifying UL beam measurement mechanism (U-1, U-2, U3) is received from DCI/ media access control control element MAC CE. If the indicator is "00" in step S1320, SRS is used for CSI acquisition in step S1330. If the indicator is "01" in step S1340, a U-1 procedure for training both the transmission and reception beams of the eNB and UE is selected in step S1350. If the indicator is "10" in step S1360, a U-2 procedure for training the reception beam of the eNB is selected in step S1370. If the indicator is "11" in step S1380, a U-3 procedure for training the transmission beam of the UE is selected in step S1390

In the case of PRACH, multiple formats for transmitting the RACH preamble are supported for UL beam measurement. In contrast, SRS is transmitted at the last symbol of a subframe. Since the shortest period is 2 ms, it is not appropriate to use the legacy SRS configuration for supporting the UL beam measurement. Accordingly, there is a need of signaling for transmitting multiple SRSs in subframes designated for SRS transmission. Such signaling may be provided in DCI, MAC CE, or RRC configuration.

In order to transmit multiple SRSs, it may be possible.

1. To allow using one or more physical uplink shared channel (PUSCH) symbols for SRS transmission while sweeping beams for transmission/reception in a subframe (resource) designated for SRS transmission 2. To allocate multiple subframes (resources) for transmitting/receiving signals while sweeping beams among subframes (resources) designated for SRS transmission 3. To transmit multiple SRSs in an orthogonal frequency division multiplexing (OFDM) symbol by reducing SRS transmission time FIG. 14 is a diagram illustrating a cell-specific SRS configuration for UL beam measurement, according to the first embodiment of the present invention.

In order to transmit SRS using a PUSCH symbol as the first method for transmitting multiple SRSs, it is necessary to provide a cell-specific SRS configuration as follows. Here, srs-MaxTrans means multiple SRS transmissions. That is, if a subframe index for transmitting SRS is configured through a cell-specific/UE-specific configuration, as many SRS transmissions as the srs-MaxTrans are transmitted in the corresponding subframe. A UE that transmits no SRS in the corresponding subframe may perform PUSCH transmission by referencing srs-MaxTrans. It should be noted that the parameter srs-MaxTrans may be transmitted by means of the UE-specific SRS configuration. In this case, however, the UE must know how many symbols are allocated for PUSCH in the corresponding subframe based on DCI.

In order to allocate consecutive subframes as the second method for transmitting multiple SRSs, it may be necessary to provide a cell-specific SRS configuration as shown in FIG. 14. Here, the parameter srs-MaxTrans indicates multiple SRSs transmission with the number of consecutive subframes rather than the PUSCH symbols in one subframe as described above. That is, if the subframe index for transmitting SRS is configured based on the cell-specific/UE-specific configuration, the SRS is transmitted during a period of at least srs-MaxTrans subframes starting from the corresponding subframe. A UE that transmits no SRS in the corresponding subframe may perform PUSCH transmission by referencing srs-MaxTrans. The parameter srs-MaxTrans may be transmitted by means of the UE-specific SRS configuration. In this case, however, the UE must know how many symbols are allocated for PUSCH in the corresponding subframe based on DCI.

FIG. 15 is a diagram illustrating a UE-specific SRS configuration for UL beam measurement, according to the first embodiment of the present invention.

In order to transmit multiple SRSs in symbols as the third method for transmitting multiple SRSs, it may be necessary to provide a cell-specific SRS configuration as shown in FIG. 15.

Here, the parameter srs-type is set to either 0 or 1 to indicate whether the SRSs are transmitted over consecutive OFDM symbols in a subframe or over consecutive subframes. The parameter srs-MaxTrans indicates multiple SRS transmissions and a number of PUSCH symbols in a subframe or a number of consecutive subframes depending on srs-type. The parameter srs-SCS indicates the subcarrier spacing for SRS transmission, and it may be possible to expect an effect of transmitting multiple SRSs in one OFDM symbol according to the value of the subcarrier spacing.

Hereinafter, a description is made of a method for allocating an SRS sequence. In LTE, the SRS sequence is determined according to the number of resource blocks (RBs) carrying an RS. For example, a sequence allocating over 100 RBs is different from a sequence allocating over 4 RBs. Accordingly, the UEs transmitting SRSs different in length cannot share the same time/frequency resources. This contributes to an SRS transmission resource management restriction. The SRS sequence varies depending on allocation band, UE-specific cyclic shift, and transmission comb value.

In order to manage the SRS resources efficiently, it may be necessary to share part or all of the resources among UEs to generate an SRS sequence by block. For example, if the smallest unit for SRS transmission is N RBs, the SRS sequence is generated to be fit for the length of N RBs.

Figure 16:
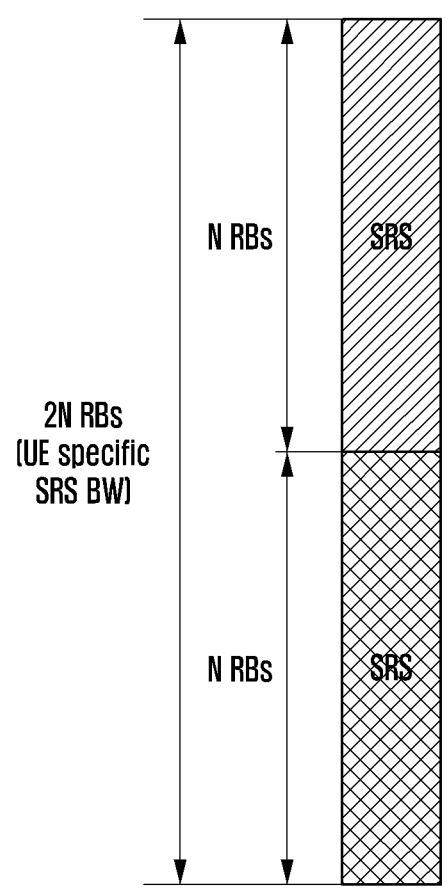
FIG. 16 is a diagram illustrating UE-specific SRS generation in a UE-specific band width (BW) according to the first embodiment of the present invention.

FIG. 16 is a diagram illustrating generating a UE-specific SRS in a UE-specific BW, according to the first embodiment of the present invention. In FIG. 16, 2N RBs denote the SRS BW allocated to a certain UE. In legacy LTE, the SRS sequence corresponding to the length of 2N RBs is generated. The eNB may notify the UE of the number of RBs for SRS sequence using a cell-specific or UE-specific SRS configuration. The cell-specific SRS configuration-based notification is advantageous in that all UEs generate the same length of SRS sequences, while the UE-specific SRS configuration-based notification is advantageous in terms of resource utilization efficiency but is disadvantageous in that the SRS resource allocation of the eNB becomes more complex.

However, the method designed for LTE is difficult to apply because the SRSs transmitted by the UEs are partially overlapped. This is because there is a lack of orthogonality between the sequences in case where the SRS transmissions are partially overlapped.

Figure 17:
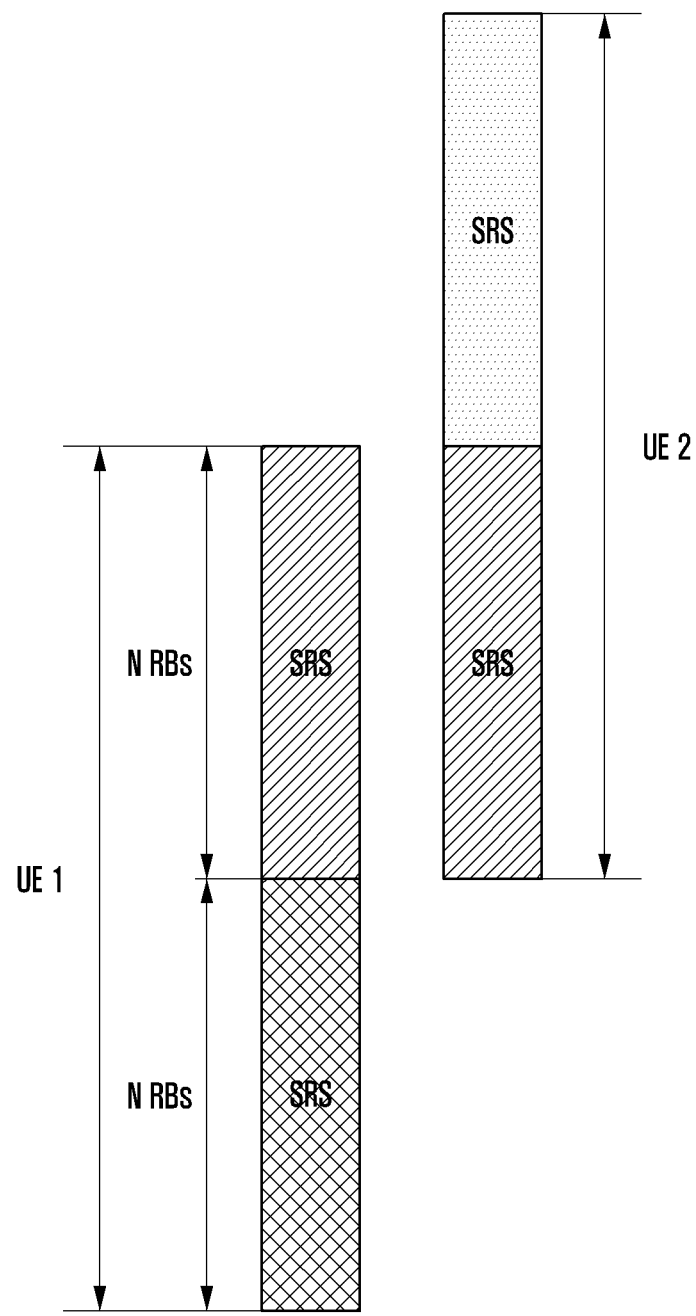
FIG. 17 is a diagram illustrating UEs to transmit SRSs as partially overlapped using a method of generating a smallest unit of an SRS sequence; according to the first embodiment of the present invention.

FIG. 17 is a diagram illustrating UEs to transmit SRSs as partially overlapped using a method of generating a smallest unit of SRS sequence, according to the first embodiment of the present invention.

In the case of allocating the sequence length of the smallest unit as shown in FIG. 16, it is possible to secure orthogonality between sequences in the RB as the smallest unit, and the SRSs may be transmitted as partially overlapped as shown in FIG. 17.

In order for the smallest unit of SRS transmission to satisfy the orthogonality condition in the corresponding band, the sequence generation method may include use of an index of RBs. That is, in a band including the $i^{th}$ RB, it may be possible to generate an SRS including the $i^{th}$ RB index. In this case, the UE-specific SRSs may satisfy the orthogonality condition in the corresponding RB. That is, the SRS sequence may be generated to have an RB index and RB length. However, since the short length of sequence may decrease an available cyclic shift value in comparison with that of LTE, it may be necessary to consider a method for generating an SRS sequence ID diversely.

In legacy LTE, the same SRS sequence ID is used by all UEs within a cell. That is, the transmission comb and cyclic shift are used for UE multiplexing. Here, a UE may increase the multiplexing gain using a UE-specific SRS ID, which is delivered to the UE by means of the SRS configuration. It may also be possible to transmit the SRS ID by means of DCI/MAC CE for dynamic scheduling.

Second Embodiment a high frequency band such as mmW will be used in the next generation communication environment for efficient frequency spectrum utilization. In such a high frequency band, significant signal attenuation occurs because of phase noise. The phase noise is caused by instability of the oscillator and a common phase error (CPE) and inter-carrier interference (ICI) caused by the phase noise decreases signal recovery capability particularly in a communication environment using a high order modulation scheme (e.g., 16QAM, 64QAM, and 256QAM).

Figure 18:
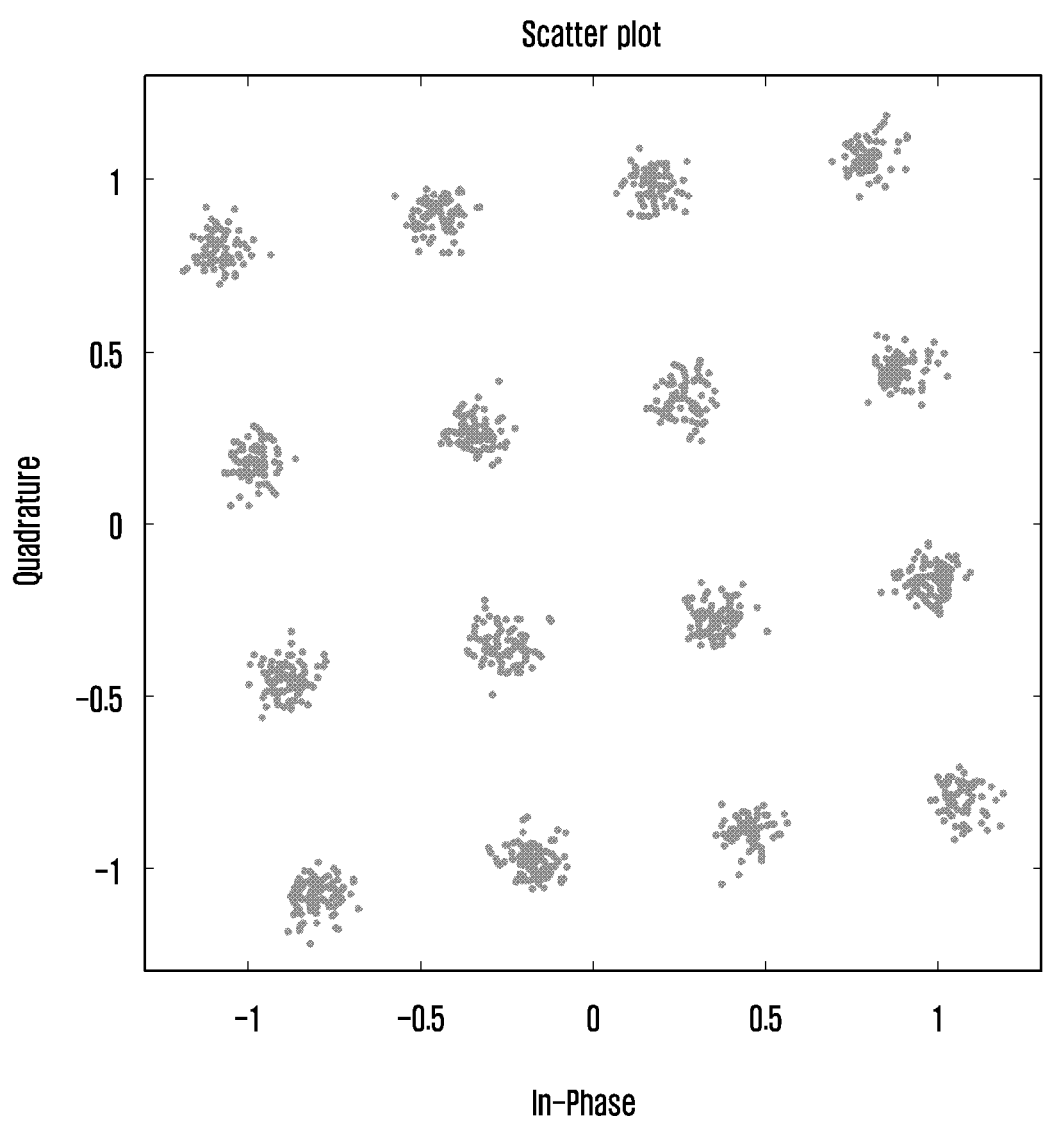
FIG. 18 is a diagram illustrating an impact of phase noise according to the second embodiment of the present invention.

FIG. 18 is a diagram illustrating an impact of phase noise, according to the second embodiment of the present invention.

FIG. 18 shows the impact of signal attenuation. Even in an ideal channel environment, the phase of a constellation changes and ICI occurs as an impact of phase noise. In order to compensate for the influence of the phase noise, there is a need for a new reference signal for estimating the phase noise. This reference signal is referred to as phase tracking reference signal (PTRS).

A number of PTRS ports are determined based on the phase noise source, which is related to the oscillator. Since different oscillators produce different phase noises, there is a need for PTRS ports identical in number with the oscillators for measurement of oscillator-specific phase noises. The number of TTRS ports may be changed in relation to the DMRS ports depending on the configuration of the transmitting end.

Figure 19:
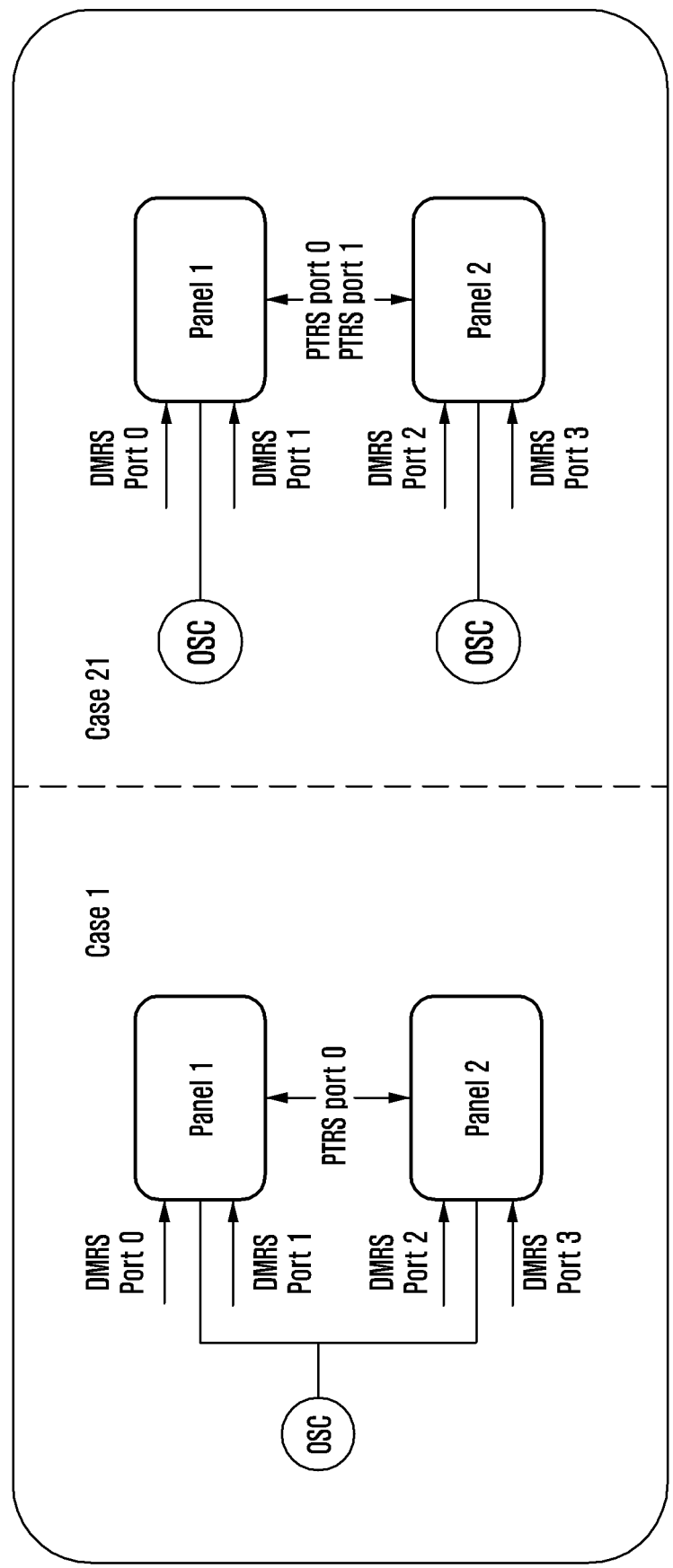
FIG. 19 is a diagram illustrating a relationship between PTRS and DMRS ports in various transmission/reception points (TRP) multi-panel environments according to the second embodiment of the present invention.

FIG. 19 is a diagram illustrating a relationship between PTRS and DMRS ports in various TRP multi-panel environments, according to the second embodiment of the present invention.

Referring to FIG. 19, case 1 shows an environment in which two panels use one oscillator, and case 2 shows an environment in which two panels each use a different oscillator. In case 1, it is possible to compensate for the phase noise using one PTRS port because there is only one phase noise source; however, in case 2 two PTRS ports are required for measuring and compensating the independent per-panel phase noises. Here, ambiguity occurs in the relationship with the DMRS port being transmitted via respective panels. In detail, although DMRS port 2 and DMRS port 3 use PTRS port 0 in case 1, they have to use PTRS ports 0 and 1 in case 2. Therefore, there is a need for a method for defining the relationship between DMRS and PTRS ports. The present disclosure proposes a method that can be applied in DL and UL environments without any restriction.

Two approaches for defining the relationship between PTRS and DMRS ports may be considered.

The first approach is to predefine a relationship between the PTRS and DMRS ports and abide by the rule of the relationship without extra periodic indication signaling. In an exemplary case of using multiple oscillators, it may be possible to calculate an offset value for use in estimating the phase noises of the respective oscillators based on the phase noise of a reference oscillator and compensate for the phase noise by providing related information. In this case, just one PTRS port is required for measuring the phase noise of the reference oscillator. For the respective DMRS ports, it may be possible to estimate the phase noises by reflecting the corresponding offset values and compensate for the phase noises.

Figure 20:
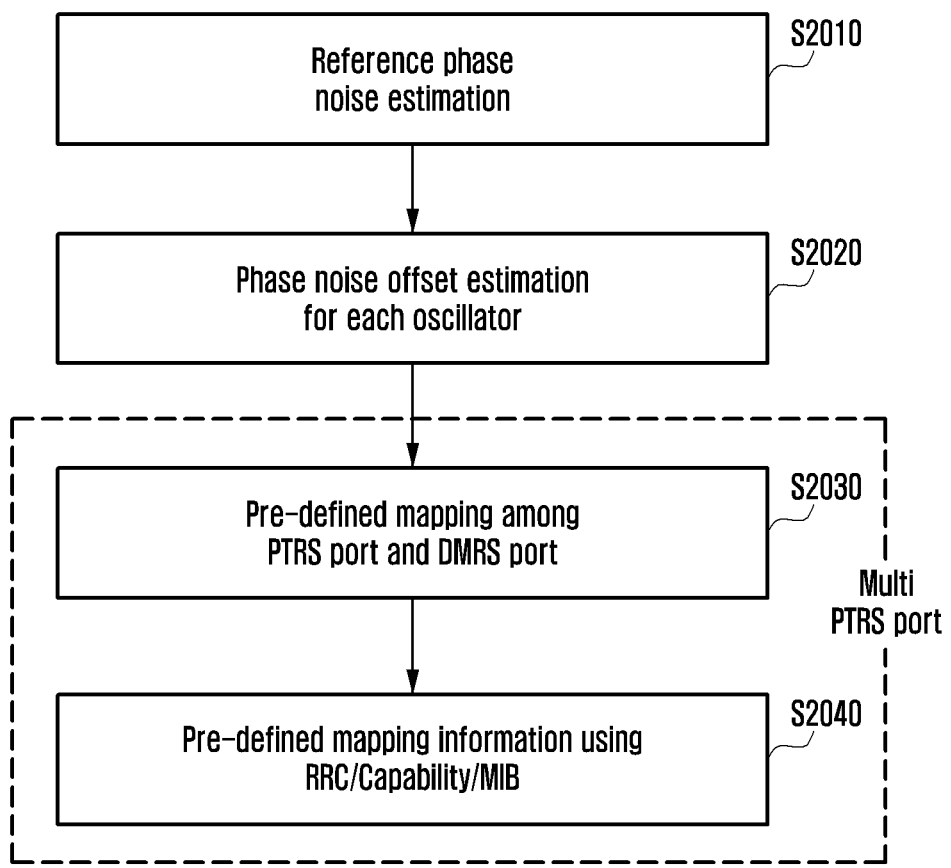
FIG. 20 is a flowchart illustrating a procedure for stipulating a relationship between PTRS and DMRS ports with a pre-definition method according to the second embodiment of the present invention.

FIG. 20 is a flowchart illustrating a procedure for stipulating a relationship between PTRS and DMRS ports with a pre-definition method according to the second embodiment of the present invention.

Referring to FIG. 20, a procedure for stipulating a relationship between PTRS and DMRS port includes reference phase noise estimation (S2010), phase noise offset estimation for each oscillator (S2020). When multi-PTRS ports are applied, the procedure further includes pre-defined mapping among PTRS port and DMRS port (S2030) and/or pre-defined mapping information using RRC/capability/MIB (S2040).

The transmitter and receiver share the information on the offset values measured in association with the reference oscillator through signaling such as RRC signaling, capability information, MIB, and SIB. In the case of using multiple PTRS ports without the offsets, it may be possible to predefine the relationship between PTRS and DMRS ports and transmit the corresponding information through signaling. The PTRS overhead and phase noise estimation and compensation stand in a trade-off relationship.

The second approach is to define the relationship between the PTRS and DRS ports through periodic indication signaling. This approach may be effective in the case where the relationship between the DMRS and PTRS ports is dynamically changed. For the indication signaling, it may be possible to use quasi-co-location (QCL) signaling, and if the large-scale properties of two ports are similar to each other, it may be possible to assume QCL. Accordingly, the relationship between the DMRS and PTRS ports can be dynamically defined through the QCL assumption between the DMRS and PTRS ports, signaling the QCL assumption. The indication signaling-based method may be used effectively even in the case of single TRP transmission with different oscillators and panel configurations and in a multi-TRP environment.

Figure 21:
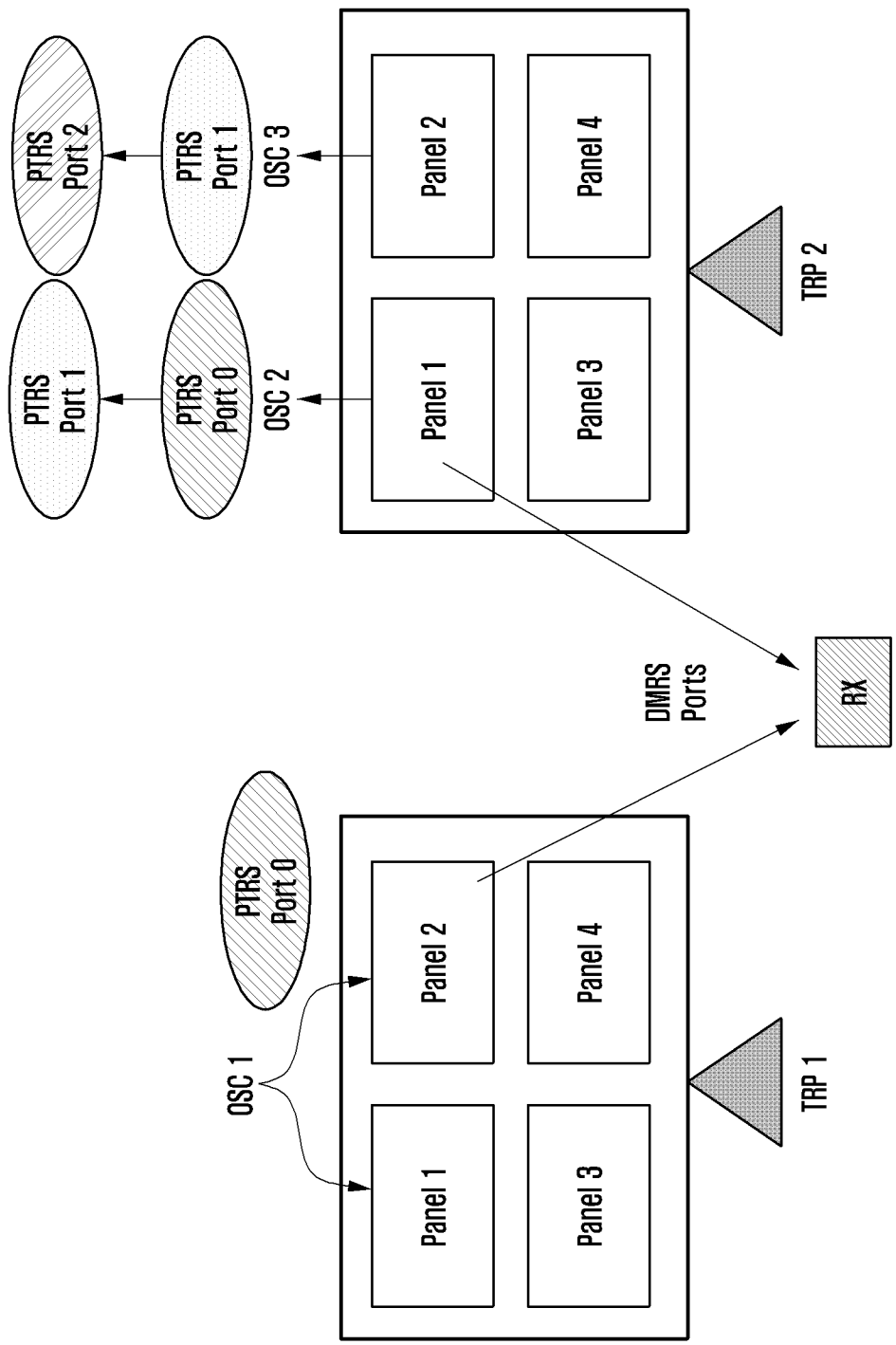
FIG. 21 is a diagram illustrating a method for relating PTRS and DMRS ports through indication signaling in a multi-TRP environment according to the second embodiment of the present invention.

FIG. 21 is a diagram illustrating a relationship between PTRS and DMRS ports in a multi-TRP environment, according to the second embodiment of the present invention. In the case that panel 1 and panel 2 of TRP 1 use one oscillator OSC 1 while panel 1 and panel 2 of TRP 2 each use different oscillators OSC 2 and OSC 3, there is a need for 3 PTRS ports for estimating phase noises produced by the respective oscillators. Since PTRS port reconfiguration is required and the relationship between the PTRS and DMRS ports may be changed depending on the transmission scheme used in the multi-TRP environment, it is necessary to define the relationship between the ports through indication signaling.

Figure 22:
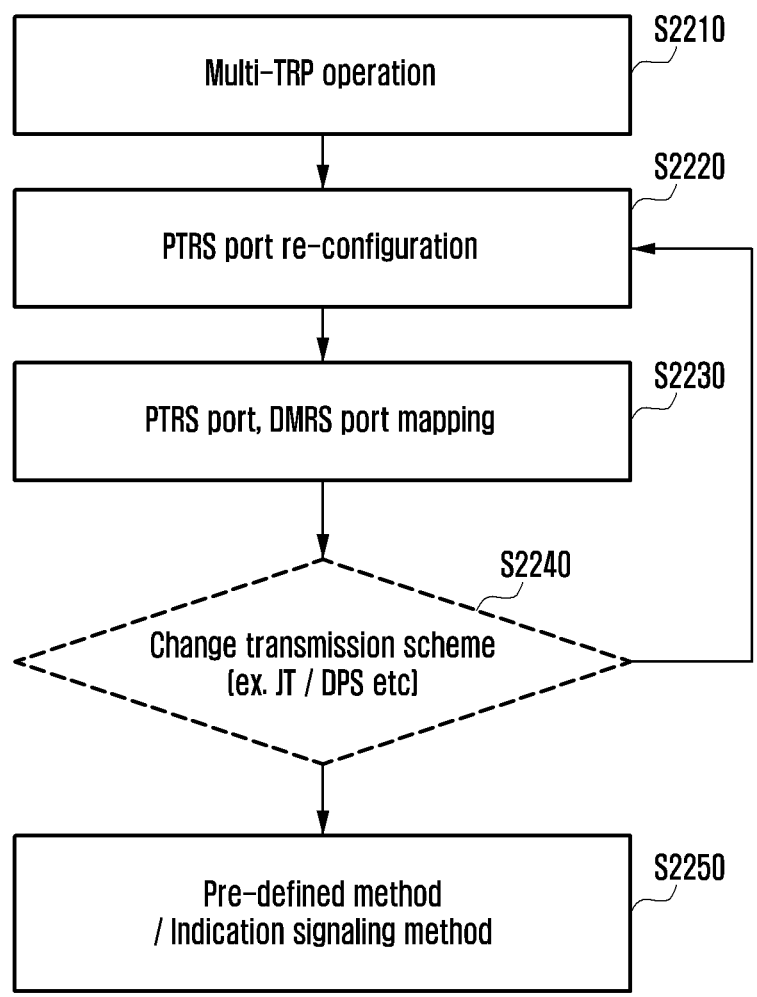
FIG. 22 is a flowchart illustrating a PTRS port reconfiguration procedure in a multi-TRP environment according to the second embodiment of the present invention.

FIG. 22 is a flowchart illustrating a PTRS port reconfiguration procedure in a multi-TRP environment, according to the second embodiment of the present invention.

Referring to FIG. 22, a PTRS port reconfiguration procedure includes multi-TRP operation identification (S2210), PTRS port re-configuration (S2220), PTRS port and DMRS port mapping (S2230), change transmission scheme (S2240), and/or pre-defined method/indication signaling method (S2250).

In detail, the number of DMRS ports and the number of PTRS ports may be set differently and independently depending on the transmission scheme, such as joint transmission (e.g., same contention window (CW) or different CWs) and dynamic point selection, for a multi-TRP environment; thus, it is necessary to correspondingly define the relationship between the DMRS and PTRS ports.

Figure 23:
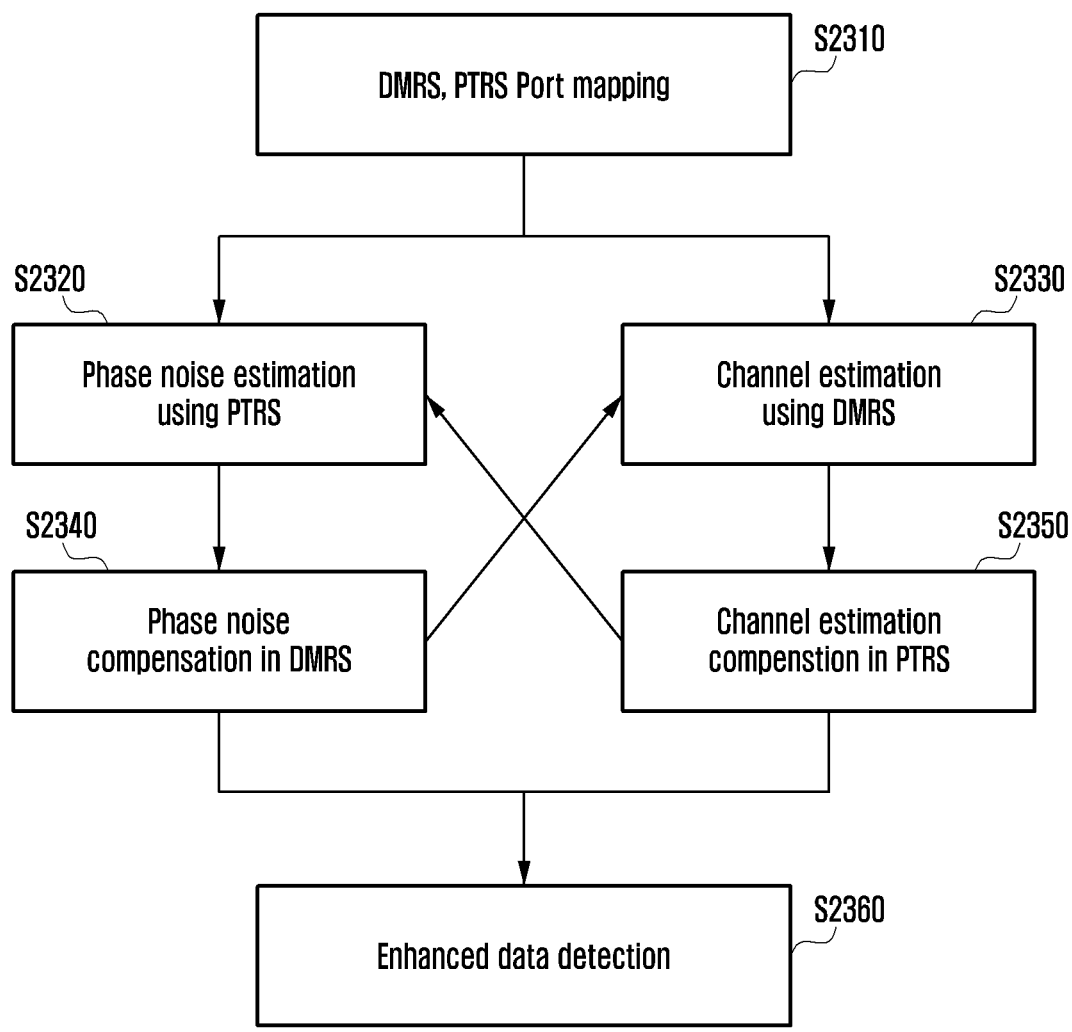
FIG. 23 is a flowchart illustrating a procedure for stipulating a relationship between PTRS and DMRS ports in a multi-panel and multi-oscillator environment of a UE according to the second embodiment of the present invention.

FIG. 23 is a flowchart illustrating a procedure for stipulating a relationship between PTRS and DMRS ports in a multi-panel and multi-oscillator environment of a UE, according to an embodiment of the present disclosure.

Referring to FIG. 23, a procedure for stipulating a relationship between PTRS and DMRS ports includes DMRS port and PTRS port mapping (S2310), phase noise estimation using PTRS (S2320), channel estimation using DMRS (S2330), phase noise compensation in DMRS (S2340), channel estimation compensation in PTRS (S2350), and/or enhanced data detection (S2360).

FIG. 23 illustrates a phase noise compensation and channel estimation procedure based on a relationship defined between PTRS and DMRS ports. It may be possible to improve channel estimation accuracy by estimating the phase noise of the PTRS ports and compensating for the phase noise before DMRS-based channel estimation. In the case where multiple DMRS ports are mapped to one PTRS port, it may be possible to improve accuracy of phase noise tracking by estimating phase noise based on the CPE measured on the multiple DMRS ports. Ultimately, it may be possible to maximize the signal recovery capability by repeating the above procedure.

Similar to the approach to the relationship between the PTRS and DMRS ports that has been discussed above, it is necessary to define the relationship between PTRS and CSI-RS. In the case that channel quality is estimated based on the CSI-RS, the value applied for channel quality estimation is likely to be different from the real channel quality because of phase noise, and this may cause an error in channel quality indication (CQI) measurement. Accordingly, it is necessary to estimate phase noise based on the PTRS and compensate for a CPE error before producing CQI information based on the CSI-RS. Similar to the occurrence of ambiguity between DMRS and PTRS ports, as described above, ambiguity may occur between the CSI-RS and PTRS ports according to the environment of allocation of CSI-RS resources per panel. Accordingly, there is a need for a mapping method for resolving the ambiguity between PTRS and CSI-RS resources.

Figure 24:
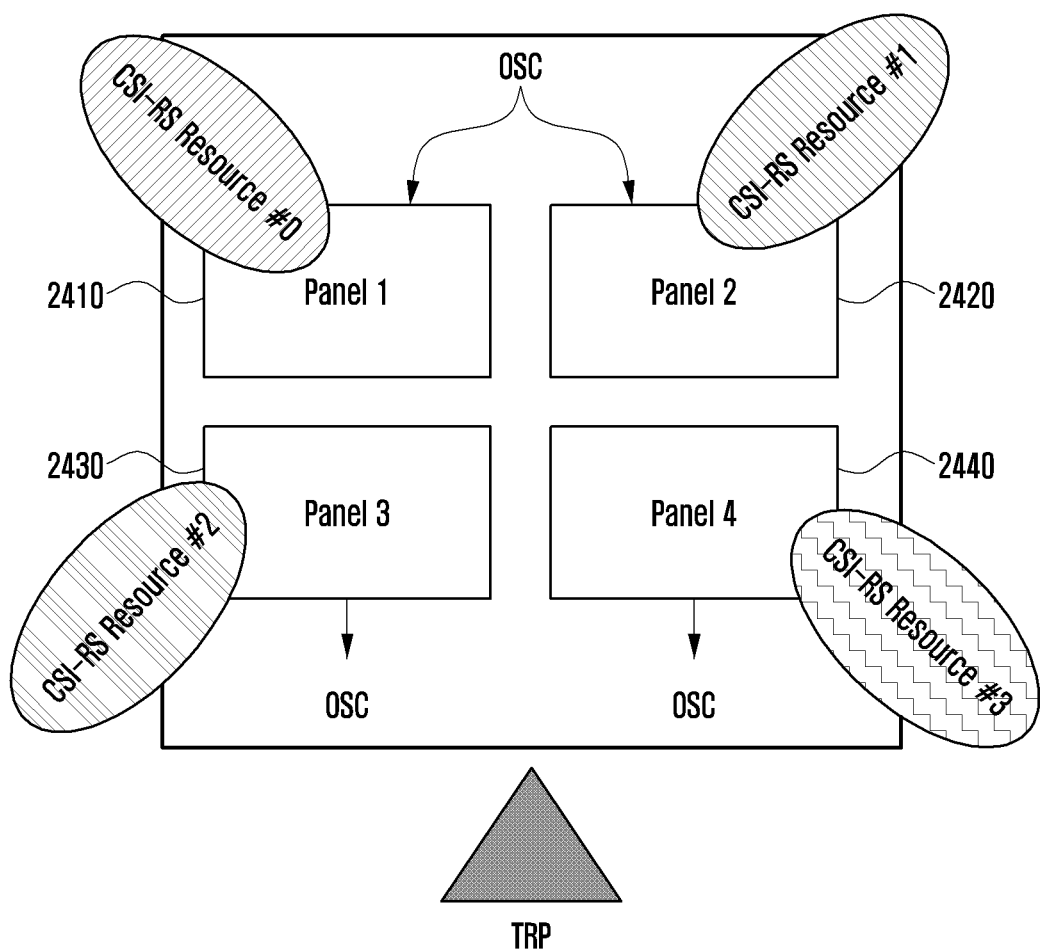
FIG. 24 is a diagram illustrating a relationship between channel state information reference signal (CSI-RS) and PTRS ports according to the second embodiment of the present invention.

FIG. 24 is a diagram illustrating a relationship between CSI-RS and PTRS ports, according to an embodiment.

FIG. 24 exemplifies a relationship between per-panel CSI-RS resources and PTRS ports. The individual panels use separate CSI-RS resources, panel 1 2410 and panel 2 2420 share one oscillator OSC 1, and panel 3 2430 and panel 4 2440 each use different oscillators OSC 2 and OSC 3. In this case, it is necessary to stipulate the relationship between the CSI-RS resources and PTRS ports in order to estimate phase noises produced by the respective oscillators OSC 1, OSC 2, and OSC 3, and compensate for the phase noises because there are 3 PTRS ports. Similar to the approach of stipulating the relationship between DMRS and PTRS ports that has been described above, it may be possible to use the method of predefining the relationship and using the predefined relationship and the method of configuring the relationship through indication signaling for stipulating the relationship between the CSI-RS resources and PTRS ports. In detail, in the case that the per-panel CSI-RS resources are maintained, it may be possible to use a predetermined relationship without any periodic signaling. In the case that the CSI-RS resources are configured dynamically, the indication signaling method may be used. Similar to the case of using the QCL assumption between the DMRS and PTRS ports and signaling the QCL assumption as described above, CQI measurement and phase noise estimation may be improved through QCL assumption between the CSI-RS resources and PTRS ports, and QCL assumption signaling. Also, the relationship between the PTRS ports and the CSI-RS resources in a multi-TRP environment may be stipulated in a similar manner to stipulating the relationship between the PTRS and DMRS ports. That is, it may be possible to reconfigure the PTRS ports depending on the multi-TRP environment and transmission scheme, and to stipulate the relationship between the TRP ports and the CSI-RS resources in the multi-TRP environment.

A detailed method for stipulating the relationship between the PTRS and DMRS/CSI-RS ports based on the QCL assumption and indication may be implemented as follows. A QCL assumption parameter may be configured between the PTRS ports and DMRS/CSI-RS to the RRC high layer signaling set and one of the parameter sets using a PDSCH resource element (RE) mapping and QCL indicator of a DCI signal may be notified explicitly. A large-scale parameter for use in QCL assumption may be explicitly notified by at least one of a delay spread, a doppler spread, a doppler shift, an average delay, and an average gain, and the receiving end may acquire the relationship between the PTRS and DMRS/CSI-RS ports based on the parameter and perform phase noise compensation, channel estimation, and CQI measurement.

As described above, the effect of the present disclosure is advantageous by reducing power consumption of a terminal and improving inter-cell paging resource utilization efficiency by transmitting an RS that is capable of supporting UL-based mobility.

Also, the effect of the present disclosure is advantageous by improving system operating efficiency by mapping a PTRS and any other RS.

The embodiments disclosed in the specification and drawings are proposed to help explain and understand the present invention rather than to limit the scope of the present invention. It is obvious to those skilled in the art that various modifications and changes can be made thereto without departing from the spirit and scope of the present invention. Embodiments described herein may be combined in whole or in part. For example, parts of multiple embodiments of the present disclosure may be combined to form another embodiment for the operations of a base station and a terminal. Although the embodiments are directed to an LTE/LTE-A system, it may be possible to apply them to other systems such as a 5G new radio (NR) system to form other alternative embodiments without departing from the spirit and scope of the present disclosure.

Figure 25:
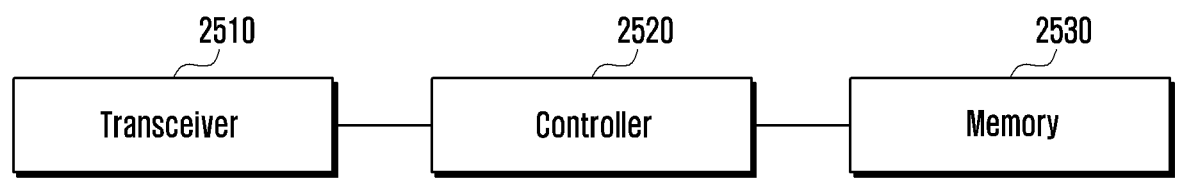
FIG. 25 is a diagram illustrating a structure of a UE according to embodiments of the present invention.

FIG. 25 is a diagram illustrating a structure of a UE, according to embodiments of the present invention.

Referring to FIG. 25, the UE may include a transceiver 2510, a controller 2520, and a memory 2530. The controller 2520 may be defined as a circuit, an application specific integrated circuit or at least one processor.

The transceiver 2510 can transmit and receive signals with other network entities and can receive system information from, for example, a base station and can further receive a synchronization signal or a reference signal.

The controller 2520 can control the overall operation of the UE. For example, the controller 2520 may control the flow of signals between each block to perform operations according to the flowcharts described above.

More specifically, the controller 2520 may receive, from the base station, association information between at least one PTRS port and at least one DMRS port, to identify the phase noise between the UE and the base station is based on the association information, and to compensate the phase noise based on the check result.

At this time, the association information indicates that the PTRS port is quasi-co-located with the DMRS port and the association information can be received through higher layer signaling.

According to an embodiment, in a multi-transmission and reception point environment, a PTRS port may be used to estimate phase noise occurring in an oscillator corresponding to the PTRS port.

According to an embodiment, the association information may include at least one of a delay spread, a doppler spread, a doppler shift, an average delay, and an average gain.

The memory 2530 may store at least one of the information transmitted/received through the transceiver 2510 and the information generated through the controller 2520. For example, the memory 2530 may store the association information on at least one PTRS port and at least one DMRS port.

Figure 26:
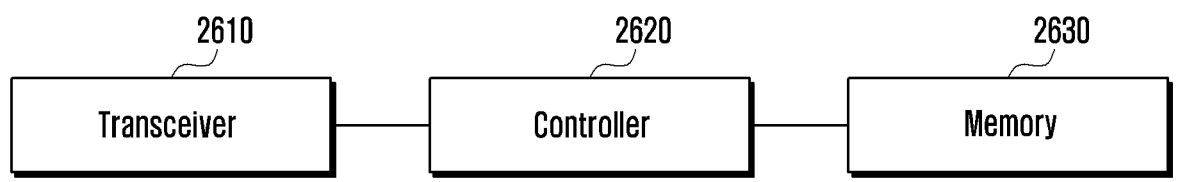
FIG. 26 is a diagram illustrating a structure of a base station according to embodiments of the present invention.

FIG. 26 is a diagram illustrating a structure of a base station, according to embodiments of the present invention.

Referring to FIG. 26, the base station may include a transceiver 2610, a controller 2620, and a memory 2630. The controller 2620 may be defined as a circuit or an application specific integrated circuit or at least one processor.

The transceiver 2610 can transmit and receive signals with other network entities. The transceiver 2610 can transmit system information to a UE, for example, and transceiver 2610 may transmit a synchronization signal or a reference signal to the UE.

The controller 2620 can control the overall operation of the base station. For example, the controller 2620 may control the flow of signals between each block to perform operations according to the flowcharts described above.

Specifically, the controller 2620 may generate association information between at least one PTRS port and at least one DMRS port, and transmit association information to the UE so that phase noise between the UE and the base station is compensated.

At this time, the association information indicates that the PTRS port is quasi-co-located with the DMRS port and the association information may be transmitted through higher layer signaling.

According to an embodiment, in a multi-transmission and reception point environment, a PTRS port may be used to estimate phase noise occurring in an oscillator corresponding to the PTRS port.

According to an embodiment, the association information includes at least one of a delay spread, a doppler spread, a doppler shift, an average delay, and an average gain.

The memory 2630 may store at least one of information transmitted/received through the transceiver 2610 and information generated through the controller 2520. For example, the memory 2630 may store association information on at least one PTRS port and at least one DMRS port.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for compensating phase noise by a user equipment (UE) in a wireless communication system, the method comprising:
   identifying whether a phase tracking reference signal (PTRS) port and at least one demodulation reference signal (DMRS) port are quasi co-located with respect to a delay spread, a doppler spread, a doppler shift, and an average delay, based on an assumption parameter including association information indicating a relationship of an electrical connection between the PTRS port and the at least on DMRS port;
   receiving, from a base station, a PTRS based on the identification that the PTRS port and the at least one DMRS port are quasi co-located;
   acquiring information on the relationship of the electrical connection between the PTRS and the at least one DMRS port based on the association information;
   estimating phase noise between the UE and the base station based on the PTRS and the acquired information; and
   acquiring data based on the estimated phase noise.

2. The method of claim 1, wherein the PTRS port is used to estimate the phase noise occurring in an oscillator corresponding to the PTRS port in a multi-transmission and reception point (TRP) environment.

3. A user equipment (UE) for compensating phase noise in a wireless communication system, the UE comprising:
   a transceiver; and
   a controller coupled with the transceiver and configured to:
   identify whether a phase tracking reference signal (PTRS) port and at least one demodulation reference signal (DMRS) port are quasi co-located with respect to a delay spread, a doppler spread, a doppler shift, and an average delay, based on an assumption parameter including association information indicating a relationship of an electrical connection between the PTRS port and the at least one DMRS port;
   receive, from a base station, a PTRS based on the identification that the PTRS port and the at least one DMRS port are quasi co-located;
   acquiring information on the relationship of the electrical connection between the PTRS and the at least on DMRS port based on the association information,
   estimate phase noise between the UE and the base station based on the PTRS and the association information; and
   acquire data based on the estimated phase noise.

4. The UE of claim 3, wherein the PTRS port is used to estimate the phase noise occurring in an oscillator corresponding to the PTRS port in a multi-transmission and reception point (TRP) environment.

* * * * *